Patented Apr. 23, 1935

1,999,068

UNITED STATES PATENT OFFICE 1,999,068

PROCESS FOR THE MANUFACTURE OF CHROMIFEROUS AZO-DYESTUFFS DYEING PINK TINTS

Fritz Straub and Willi Widmer, Basel, Switzerland, assignors to the firm of Society of Chemical Industry in Basle, Basel, Switzerland No Drawing. Application February 8, 1934, Serial No. 710,372. In Switzerland February 22, 1933

4 Claims. (Cl. 260—12)

It has been found that chromiferous azo-dyestuffs which dye pink tints are obtained from the chromiferous azo-dyestuffs which dye blue-red tints and are obtainable by heating with chromium fluoride azo-dyestuffs of the general formula

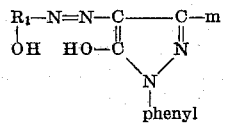

wherein $R_1$ represents a monosulfonated naphthalene radical and wherein the hydroxyl group of the naphthalene radical $R_1$ stands in ortho-position to the azo-bridge, wherein further $m$ represents methyl or carboxyl and the phenyl radical contains no salt-forming group, by a continued heating of the reaction mixture containing the chromiferous azo-dyestuff that dyes blue-red tints.

The reaction mixtures containing the chromiferous azo-dyestuffs which dye blue-red tints and are suitable parent materials for this invention may be made by heating with chromium fluoride the azo-dyestuffs of the above general formula obtained, for example, from diazotized 1-amino-2-hydroxynaphthalene-4-sulfonic acid, diazotized 1-hydroxy-2-aminonaphthalene-4-sulfonic acid, diazotized 1-amino-2-hydroxynaphthalene-6-sulfonic acid, diazotized 1-amino-2-hydroxynaphthalene-6-chloro-4-sulfonic acid, diazotized 1-amino-2-hydroxynaphthalene-6-bromo-4-sulfonic acid, nitrated 1-diazo-2-hydroxynaphthalene-4-sulfonic acid as well as nitrated 1-diazo-2-hydroxynaphthalene-6-sulfonic acid, by coupling with different 1-phenyl-5-pyrazolones containing no salt-forming groups such as, for example, sulfonic acid groups or sulfonamide groups, such as, for example, 1-phenyl-3-methyl-5-pyrazolone, 1-phenyl-3-carboxy-5-pyrazolone or derivatives of either of these containing as a substituent in the phenyl nucleus halogen, nitro-groups, alkyl-groups or alkoxy-groups; the chromium fluoride may be present in small or large excess and the heating may be conducted in an open vessel or under pressure. Moreover, in making this reaction mixture, the azo-dyestuff may be used in the form either of free acid or of a mono- or di-salt, such as the sodium, potassium, ammonium, magnesium or calcium salt.

A continued heating of the reaction mixture containing the chromiferous azo-dyestuff which dyes blue-red tints may occur in an open vessel or under pressure. In case the reaction mixture has been made with the use of a small or a large excess of chromium fluoride, or with the use of the azo-dyestuff in the form of free acid or a mono- or di-salt, it is advantageous to dilute the reaction mixture with water. The dilution is particularly favorable when the reaction mixture has been made with the use of a large excess of chromium.

The chromiferous azo-dyestuffs obtainable by this invention may be used for dyeing any desired material; they are, however, especially suitable for dyeing animal fibres, such as wool and silk, on which they produce clear and very fast rose tints.

The following examples illustrate the invention, the parts being by weight:—

Example 1

The dyestuff made in alkaline solution from 250 parts of diazotized 1-amino-2-hydroxynaphthalene-4-sulfonic acid and 180 parts of 1-phenyl-3-methyl-5-pyrazolone of the formula

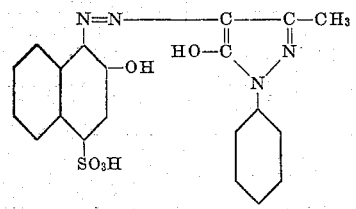

is separated in known manner by addition of acid, filtered, and washed with common salt solution of 2 per cent. strength.

The dyestuff paste thus obtained is heated to boiling with about 10,000 parts of water and thereupon mixed with a hot chromium fluoride solution made by dissolving 605 parts of a chromium oxide paste of 14 per cent. strength in 132 parts of hydrofluoric acid of 50 per cent. strength. The mixture is now boiled until the parent dyestuff has disappeared, that is to say until the chromiferous dyestuff which dyes blue-red has been formed. The boiling is then continued for 25 to 30 hours in a reflux apparatus, until the formation of the desired chromium compound has been completed. The dyestuff which separates in a crystalline form is filtered, while hot, and washed with about 1000 parts of cold water. When dry it is a brown-red powder which dissolves in dilute sodium carbonate solution to a red solution and in concentrated sulfuric acid to an orange red solution. It dyes wool and silk very pure rose tints of good fastness.

Example 2

46,8 parts of the disodium salt of the azo-dyestuff from diazotized 1-amino-2-hydroxynaphthalene-4-sulphonic acid and 1-phenyl-3-methyl-5-pyrazolone are dissolved in about 1500 parts of water and the solution is mixed with one of chromium fluoride which has been made by dissolving 15,2 parts of chromium oxide of 100 per cent. strength and 24 parts of hydrofluoric acid of 50 per cent. strength and 250 parts of water. The mixture is first boiled until the chromiferous dyestuff which dyes blue-red has been formed and is then kept boiling for a further period in a reflux apparatus. The chromium compound which has separated in crystalline form is filtered hot and washed with cold water. It has dyeing properties which are the same as those of the chromium compound obtained as described in Example 1, paragraph 2.

Like results are obtained when still larger proportions of chromium fluoride are used. In this case it is advantageous, however, to use a more diluted reaction solution.

*Example 3*

295 parts of 6-nitro-1-diazo-2-hydroxynaphthalene-4-sulfonic acid are coupled in alkaline solution with 180 parts of 1-phenyl-3-methyl-5-pyrazolone. The dyestuff thus formed of the formula

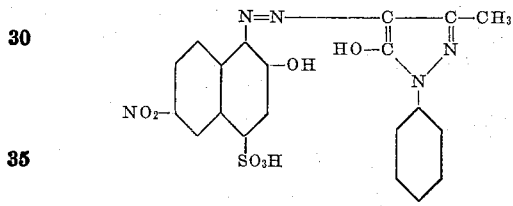

is separated by the addition of acid and filtered. The dyestuff paste thus obtained is mixed with 11,000 parts of water and the mixture is heated to boiling and there are added 2000 parts of a chromium fluoride solution of 6 per cent. strength. The mixture is now heated to boiling for 10–12 hours. After this lapse of time, the chromiferous dyestuff which dyes blue-red has been formed. The mixture is then maintained at the boil for 25 to 30 hours. The chromium compound which has separated in crystalline form is filtered hot and washed with about 800 parts of cold water. The dried dyestuff is a brown red powder, soluble in dilute sodium carbonate solution to a yellow red solution and in concentrated sulfuric acid to an orange-yellow solution. It dyes wool and silk pure yellowish-rose tints of good fastness.

*Example 4*

42.4 parts of the dyestuff from diazotized 1-amino-2-hydroxynaphthalene-4-sulphonic acid and 1-phenyl-3-methyl-5-pyrazolone (free dyestuff acid) are heated in a pressure vessel to 125–130° C. with 1000 parts of water and 200 parts of chromium fluoride solution of 6 per cent. strength. The chromium compound which separates in crystalline form is filtered and washed with cold water. It has the same dyeing properties as have been ascribed to the chromium compound made in accordance with Example 1, paragraph 2.

What we claim is:—

1. Process for the manufacture of chromiferous azo-dyestuffs which dye pink tints from the chromiferous azo-dyestuffs which dye blue-red tints and are obtainable by heating with chromium fluoride, azo-dyestuffs of the general formula

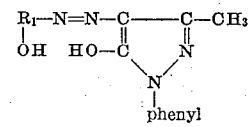

wherein $R_1$ represents a monosulfonated naphthalene radical and wherein the hydroxyl group of the naphthalene radical $R_1$ stands in ortho-position to the azo-bridge, wherein further the phenyl radical contains no salt-forming group, consisting in a continued heating of the reaction mixture containing the chromiferous dyestuff that dyes blue-red tints.

2. Process for the manufacture of chromiferous azo-dyestuffs which dye pink tints from the chromiferous azo-dyestuffs which dye blue-red tints and are obtainable by heating with chromium fluoride, azo-dyestuffs of the formula

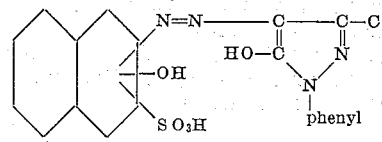

wherein the hydroxyl group of the naphthalene radical stands in ortho-position to the azo-bridge, and wherein further the phenyl radical contains no salt-forming group, consisting in a continued heating of the reaction mixture containing the chromiferous dyestuff that dyes blue-red tints.

3. Process for the manufacture of chromiferous azo-dyestuffs which dye pink tints from the chromiferous azo-dyestuffs which dye blue-red tints and are obtainable by heating with chromium fluoride, azo-dyestuffs of the formula

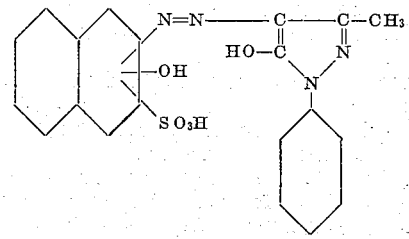

wherein the hydroxyl group of the naphthalene radical stands in ortho-position to the azo-bridge, consisting in a continued heating of the reaction mixture containing the chromiferous dyestuff that dyes blue-red tints.

4. Process for the manufacture of a chromiferous azo-dyestuff which dyes pink tints from the chromiferous azo-dyestuff which dyes blue-red tints and is obtainable by heating with chromium fluoride, the azo-dyestuff of the formula

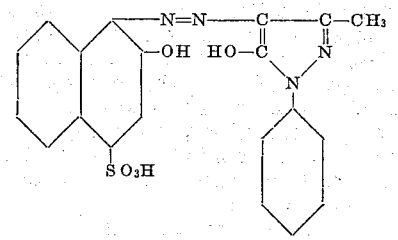

consisting in a continued heating of the reaction mixture containing the chromiferous azo-dyestuff that dyes blue-red tints.

FRITZ STRAUB.
WILLI WIDMER.